United States Patent [19]

Huber

[11] 4,333,138
[45] Jun. 1, 1982

[54] POWER SUPPLY FOR LOAD CONTROLLER

[75] Inventor: Paul G. Huber, Pawtucket, R.I.

[73] Assignee: General Electric Company, Schenectady, N.Y.

[21] Appl. No.: 181,813

[22] Filed: Aug. 27, 1980

[51] Int. Cl.³ .................................... H02P 13/26
[52] U.S. Cl. ..................................... 363/89; 320/1; 323/237; 323/272
[58] Field of Search .................. 320/1, 39, 40; 363/89, 363/94, 127; 323/271, 237, 272; 361/18, 91

[56] References Cited

U.S. PATENT DOCUMENTS

| | | | |
|---|---|---|---|
| 3,435,320 | 3/1969 | Lee et al. | 363/19 |
| 3,551,786 | 12/1970 | Van Gulik | 320/39 |
| 3,760,228 | 9/1973 | Uchida | 361/91 |
| 3,769,572 | 10/1973 | Doubt | 361/18 |
| 4,031,450 | 6/1977 | Hammel et al. | 320/39 |

FOREIGN PATENT DOCUMENTS 47-22491  6/1972  Japan ..................................... 363/127

*Primary Examiner*—William H. Beha, Jr.
*Attorney, Agent, or Firm*—Geoffrey H. Krauss; James C. Davis, Jr.; Marvin Snyder

[57] ABSTRACT

A power supply, for providing operating potential to a load switching controller, is connected in series between an A.C. source and at least one power-consuming load, and in parallel with the controller to which operating potential is provided. The power supply operates by connection of the source to charge an output capacitor only during a single polarity half-cycle of the source; the connection is terminated when the output voltage, across the capacitor, reaches a predetermined magnitude.

8 Claims, 4 Drawing Figures

4,333,138

POWER SUPPLY FOR LOAD CONTROLLER

BACKGROUND OF THE INVENTION

The present invention relates to power supply apparatus and, more particularly, to a novel power supply providing operating potential to a load controller in series between a power source and a controlled load.

It is desirable to actuate each of a plurality of power-consuming loads, and to set the power-consumption level thereof, from a central control facility. Switching and control of the power-consuming loads are advantageously commanded both manually and on a programmed basis. Further, a system allowing such load activation and level control will advantageously provide a common transmission medium between the central facility and all of the plurality of remote locations, to reduce the cost of the system. For example, all of the lights in a residence may be controlled by a central facility allowing the light level in each room of the residence to be adjusted on a time-of-day schedule, while further providing for manual intervention from specific locations (such as at the house entrance or in the master bedroom) for controlling all light sources within that residence.

Heretofore, individual wiring, between remote switches and each load to be energized and level controlled, was commonly utilized. More recently, centrally-programmable load switching systems have been utilized for the purpose of enabling and disabling current flow through a particular load; active control of the power consumption of a single load has not been hitherto possible in programmable, central-control systems. Such systems require at least one load control and switching means (hereinafter, a load controller) connected in series between the system power source. In many embodiments of load controller circuitry, an economical power supply is required for providing operating potential to the load controller.

BRIEF SUMMARY OF THE INVENTION

In accordance with the invention, a power supply, for supplying operating potential of a preselected polarity to a load controller, is connected in parallel with the load controller between an A.C. source and a controlled load, and is effectively in series with the load. A capacitance, connected across the power supply output, is charged to a predetermined voltage during each source waveform half-cycle of the predetermined polarity. Charging is accomplished by means of a switch which is closed at the commencement of the selected polarity half-cycle and opened when the output capacitance voltage reaches the predetermined level.

In presently preferred embodiments, the power supply, connected in parallel with the load controller, utilizes a gateable undirectionally-conductive device in series with a diode and a resistance, between the hot line input and hot line output of the load controller. A switching device is turned on when current flows through the diode, with the gateable device in the non-conductive state. A zener diode is connected between the gateable device gate electrode and the output, and gates on the gateable device when the output voltage reaches a magnitude set by the zener voltage, to turn off the switching device and cease charging of the power supply output capacitance.

Accordingly, it is one object of the present invention to provide a novel power supply for providing operating potential to an associated load control and switching means.

This and other objects of the present invention will become apparent to those skilled in the art upon consideration of the following detailed description, when read in conjunction with the drawings.

DETAILED DESCRIPTION OF THE INVENTION

Figure 1:
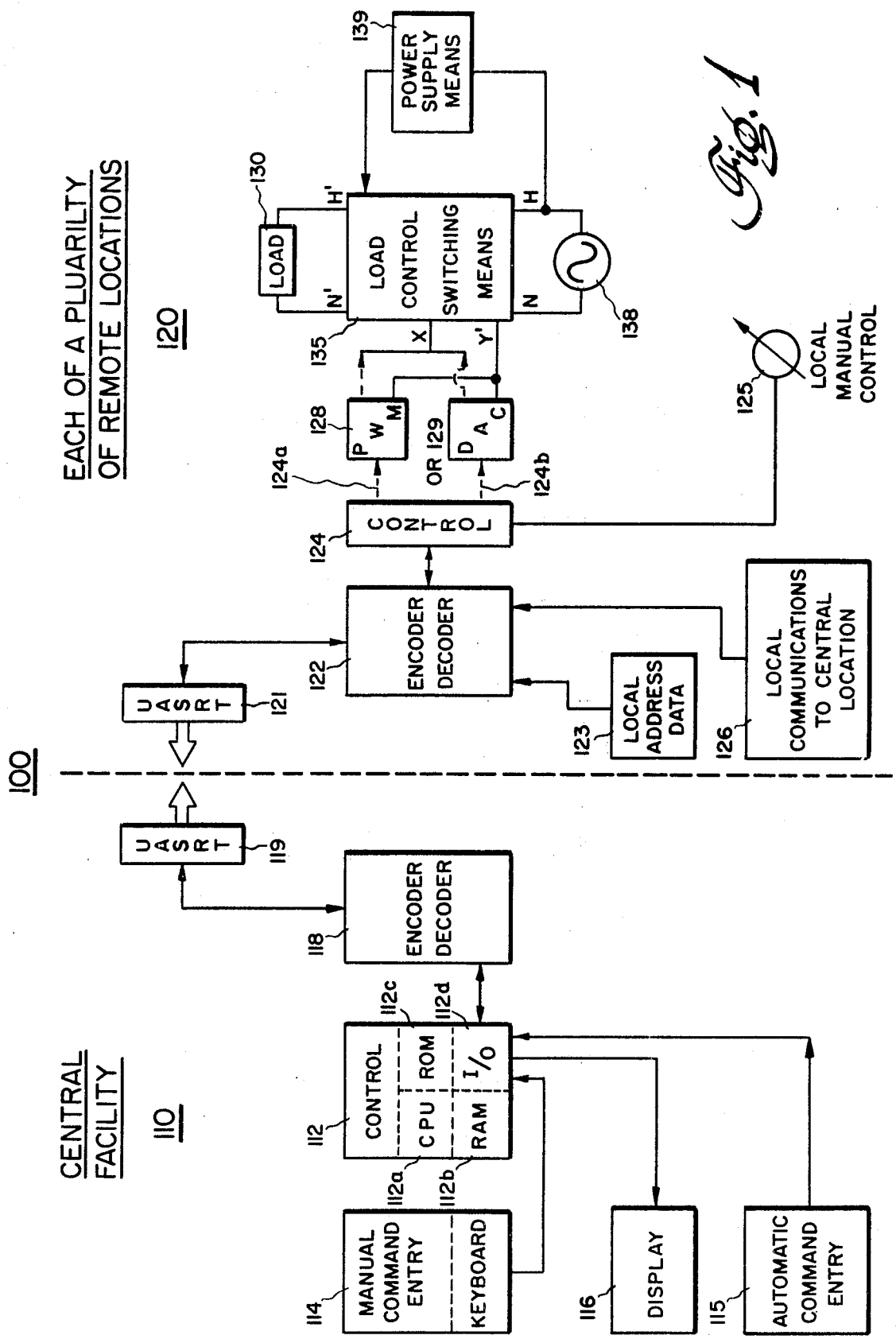
FIG. 1 is a block diagram of a programmable load control and switching system, illustrating one use for the power supply of the present invention.

Referring initially to FIG. 1, one system 100 for controlling load power, for example, to dim the luminous output of a plurality of incandescent lighting sources, from, and at, each of a multiplicity of locations, is shown. The system is described and claimed in copending application Ser. No. 181,812 filed on even date herewith, assigned to the assignee of the present application and incorporated herein by reference. Briefly, system 100 comprises a central facility 110, at which is located a control computer 112 having an input-output section (I/O) 112d. A digital encoder and decoder means 118 is connected for two-way communication with I/O section 112. The distinct address of each of the plurality of remote locations, as well as the data to be transmitted thereto, is received from the I/O section and encoded into the particular transmission format utilized by encoder-decoder means 118. The encoder data is then provided to a universal asynchronous-synchronous receiver transmitter means (UASRT) 119, for communication via a selected transmission media to all of the plurality of remote locations. Similarly, encoded data from a remote location is received by UASRT 119, from the transmission media, and is provided to encoder-decoder means 118 for decoding, and subsequent presentation to the I/O section 112d of the central control computer means 112.

At each of a plurality of remote locations 120, a universal asynchronous-synchronous receiver transmitter means (UASRT) 121 receives the encoded address and data transmission from the media and provides the received transmission to an encoder-decoder means 122. The incoming transmission is decoded and the address portion of the transmission is checked against local address data stored in local address data means 123. If the local address data corresponds to the address sent as part of a particular transmission, decoder means 122 provides the data portion of that transmission to a control means 124. Similarly, data from each local control means 124 may be encoded and sent via the transmission media to central facility 110. Thus system 100 has a central facility providing each of a plurality of remote locations with data sufficient to provide each unique-local-address remote location with a control data output at the outputs of control means 124, is equally as well utilizable for that portion of the system shown in FIG. 2.

Connected to one of outputs 124a or 124b of control means 124 is a means, such as a pulse-width modulator (PWM) 128 or a digital-to-analog converter (DAC) 129 receiving the digital data, recovered from the transmission to the particular local address of that one of the plurality of remote locations, for conversion to a level-setting analog voltage. The digital data, available at that one of control outputs 127a or 127b utilized, preferably establishes the value a parameter of the output of that one of PWM means 128 or DAC means 129 utilized, whereby a signal is received at a control input X of a load control switching means 135, which signal has a programmable parameter, for example, programmable pulse-width in a fixed-repetition-interval (if PWM means 128 is utilized) or programmable amplitude of a D.C. voltage (if DAC means 129 is utilized). The programmably-established parameter of the control voltage at switching means input X establishes the duration of the conduction time during each half-cycle of the waveform A.C. power source 138. Load control means 135 may receive operating potential from a power supply means 139, preferably connected across the control means, i.e. effectively in series connection with load 130.

Figure 2:
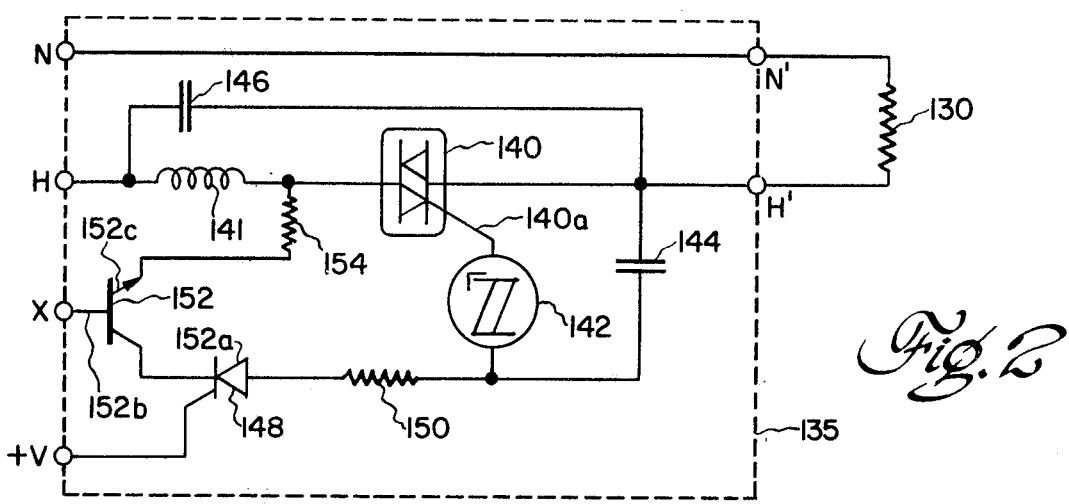
FIG. 2 is a schematic diagram of one possible load controller, usable in the system of FIG. 1, and requiring a D.C. operating potential, to be supplied by the power supply of the present invention.

In a remote lamp dimming embodiment of system 100, the load controller 135 performs both the "on-off" switching function and a "dimming function". Controller 135 may, in one presently preferred embodiment, be as shown in FIG. 2 in which a gateable device 140, such as a triac and the like, is used. The triac has a controllable-conduction main circuit connected in series with an inductance 141 between the hot line input H and the controlled hot line output H', although connections in series between neutral line input N and neutral line output N is equally as well utilizable. A four-layer triggering device 142 is connected between a gateable device gate electrode 140a and control point Y'. A capacitor 144 is connected between the hot line input H and control point Y'. In this embodiment, the source neutral line connection N is connected directly to load neutral line connection N. A capacitor 146 is connected between source hot line connection H and load hot line connection H; inductance 141 and capacitance 146 comprise a radio-frequency-interference filter.

The junction between trigger device 142 and capacitor 144 is connected to the anode of SCR 148 through a resistance element 150. The gate electrode of the SCR is connected to a positive polarity D.C. potential, of magnitude +V volts. The cathode electrode of the SCR is connected to the collector electrode 152a of a NPN transistor 152. The base electrode 152b of the transistor is connected to control input X, while the emitter electrode 152c thereof is connected through a resistance element 154 to the junction between inductance 141 and gateable device 140. This embodiment is especially useful with logic circuitry utilizing only a single-ended positive voltage power supply for providing the operating potential thereto. By connecting the SCR gate to a positive voltage +V, the control input X is floated with respect to the logic circuitry operating potential. The logic power supply must present a low impedance to alternating current, such that charging of capacitance 176 is not substantially affected. Thus by providing a positive control signal at control input X, with respect to the virtual ground at source neutral terminal N, transistor 152 can be turned on at any time during either of the source waveform half-cycles, to trigger SCR 148, and allow the SCR to pass A.C. current through resistance 150, to charge capacitance 144. When sufficient charging of capacitance 144 has occurred, gateable device 140 is triggered and load current conduction commences.

Figure 3A:
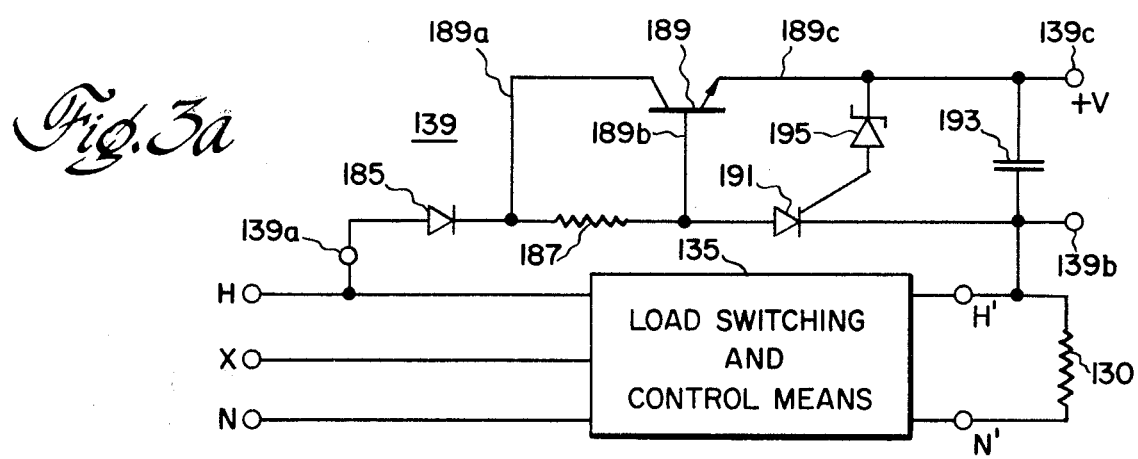
FIGS. 3a and 3b are schematic diagrams of presently preferred embodiments of power supplies for supplying operating potential to a load controller, in accordance with the principles of the present invention.

In accordance with the invention, a power supply 139 (see FIG. 1) for supplying an operating potential (such as positive polarity operating potential +V in FIG. 2) is effective in series-connection between the load and the source. Accordingly, standard transformer techniques cannot be used, nor can resistive or capacitive voltage-dropping techniques be utilized, to provide the control means operating potential from the relatively high-voltage A.C. source 138, due to the undesirable heat generation and/or physical bulk required. A first presently preferred embodiment of power supply 139 is illustrated in FIG. 3a. Power supply input 139a is connected to source hot line terminal H and power supply output common terminal 139b is connected to the load hot line output H' of the load control means 135. Input 139a is connected to the anode of a series-pass diode 185, having its cathode connected to a first terminal of a resistor 187 and to the collector electrode 189a of a series-pass transistor 189. The series-pass transistor base electrode 189b is connected to the remaining terminal of resistor 187, as is the anode of a silicon-controlled rectifier (SCR) 191. The SCR cathode is connected to power supply output common terminal 139b, as is one terminal of an output filter capacitance 193. The remaining terminal of capacitance 193 and the series-pass transistor emitter electrode 189c are connected to the power supply positive potential output 139c. The gate electrode of SCR 191 is connected to the anode of a zener diode 195, having its cathode connected to supply output terminal 139c.

In operation, at the start of each positive half-cycle of the source waveform, the gateable device 140, in load controller 135, is initially nonconducting, whereby the instantaneous source voltage appears between load controller hot line input H and load control and switching means hot line output H', and therefore between the power supply input 139a and power supply output common 139b. Diode 185 is forward biased. Resistance 187 is selected to cause transistor 189 to saturate, causing a current to flow into and rapidly charge output capacitor 193. Typically, capacitor 193 is charged to the voltage level required for the operating potential source (a magnitude of +V) for load controller 135, with the charging taking place in 1 millisecond for a 60 Hz source waveform. The zener voltage of zener diode 195 is chosen to provide a firing signal to the gate electrode of SCR 191 when the voltage across capacitance 193 reaches the desired power supply output potential V. Upon firing, SCR 191 removes base current from transistor 189, which turns off to cause cessation of current flow into capacitance 193. At the zero crossing between the positive and negative half-cycles of the source A.C. waveform, the SCR is reset. Diode 185 is reversed-biased during the negative polarity half-cycle of the source waveform, whereby power supply 139 operates only during each positive polarity source waveform half-cycle. Thus, the desired operating potential V is provided by a power supply having a very low duty-cycle, which allows almost all of the source power to be available to the controlled load 130. The power supply utilizes a relatively low-power transistor which, being switched from fully saturated to fully cut-off, dissipates relatively little energy and produces relatively little heat. It should be understood that a negative operating potential may be equally as well supplied by power supply means 139, by the appropriate reversal of polarity of diodes 185 and 195, transistor 189 and SCR 191, such that the output capacitance is charged during the negative polarity source waveform half-cycle.

Figure 3B:
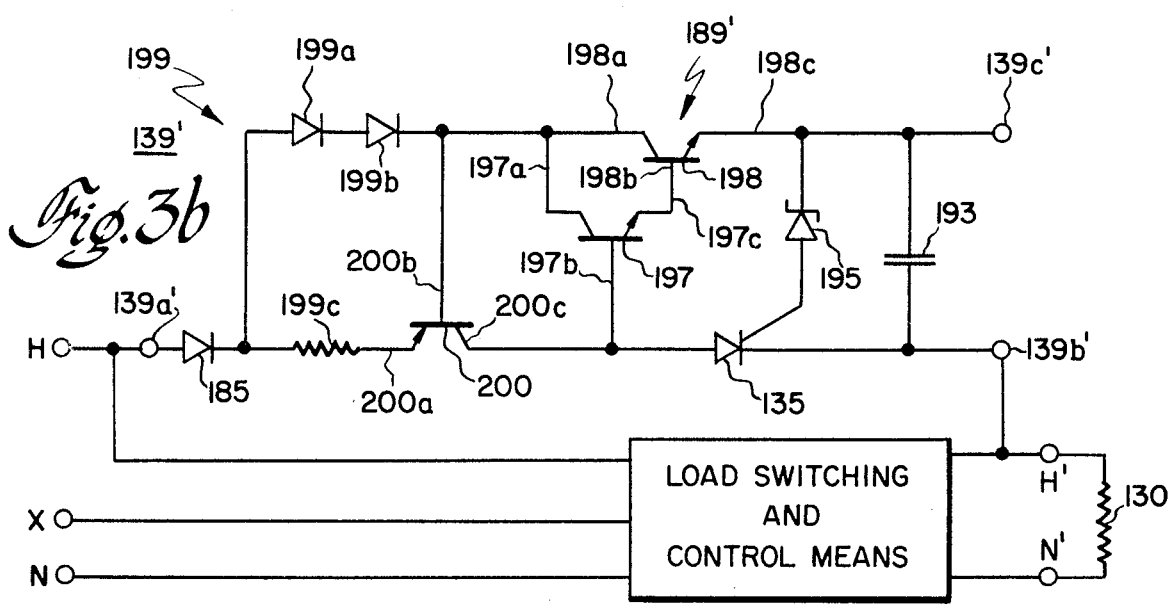

The power supply circuit of FIG. 3a is satisfactory for energizing operating loads having a power drain of less than about ¼ watt. In some embodiments of load controller 135, a positive operating potential of about 8 volts, at an operating current of about 70 milliampes (or a power level of approximately ½ watt) is required. A medium-output-power-level power supply 139' is illustrated in FIG. 3b. Power supply input 139a' is connected to source hot line terminal H, while power supply output common connection 139b' is connected to controlled hot line output H'. Input diode 185, SCR 191, output capacitance 193 and zener diode 195 are connected as in the low-power-level power supply 139 of FIG. 3a. Due to the greater power level involved, series-pass transistor 189', is replaced by a series-pass Darlington transistor arrangement 189', having first and second transistors 197 and 198, respectively. The saturation resistance 187 is replaced by a current source 199 having a first diode 199a having its anode connected to the cathode of diode 185 and having its cathode connected to the anode of a second diode 199b. The cathode of diode 199b is connected to the parallel-connected collector electrodes 197a and 198a of transistors 197 and 198. One terminal of a resistance 199c is connected to the cathode of diode 185 and to the emitter electrode 200a of a PNP transistor 200. The base electrode 200b of current-source transistor 200 is connected to the junction between the cathode of diode 199b and collector electrodes 197a and 198a. The current-source transistor collector electrode 200c is connected to the anode of SCR 191 and to the base electrode 197b of transistor 197. The emitter electrode 197c of the first transistor in Darlington pair 189' as connected to the base electrode 198b of the second Darlington transistor 198. The second Darlington transistor emitter electrode 198c is connected to power supply output 139c.

Power supply 139' operates in manner similar to the hereinabove described operation of power supply 139, with diode 185 being forward biased during each positive source waveform half-cycle, whereby current source 199 supplies a current, to the Darlington pair base electrode 197b, of magnitude sufficient to saturate both Darlington transistors and cause rapid charging of capacitance 193. The value of capacitance 193 is determined by the allowable power supply ripple voltage, in accordance with the formula $C=Vr(I/F)$, where C is the value of capacitance 193 in farads, Vr is the allowable ripply voltage, I is the current drawn from the output of power supply 139', and F is the power line frequency (60 Hz). Charging of capacitance 193 continues until a voltage, set by the zener voltage of diode 195, is reached, whereupon SCR 191 is triggered and base drive is removed from the Darlington transistor pair 189', causing charging of capacitance 193 to terminate. The SCR returns to the nonconductive condition at the end of the positive half-cycle. Again, it should be understood that, while a positive voltage supply is shown, a negative operating potential supply may be equally as well implemented by reversing polarity of all semiconductive components, including diodes 185, 199a, 199b, and 195, transistors 197, 198 and 200 and SCR 191.

Several embodiments of a power supply for a load controller have just been described. Many variations and modifications will now occur to those skilled in the art. It is my intent, therefore, that I be limited only by the scope of the appending claims and not by the specific details presented herein.

What is claimed is:

1. A power supply for providing an operating potential of a selected polarity and magnitude to apparatus connected in series between an A.C. energy source and an energy-consuming load, comprising:
an input terminal connected to said source:
a power supply output terminal;
means connected between said output and common terminals for storing electrical charge;
means connected to said input terminal for charging said storage means during a half-cycle of said A.C. source having said selected polarity, said charging means including a unidirectionally-conducting element having a first electrode connected to said input terminal and a second electrode, said element being polarized to conduct only during said source half-cycle of selected polarity; means connected between said second electrode and said output terminal for providing a flow of current into said charge storing means during at least a portion of the conduction time interval of said unidirectionally-conducting element, and including a solid-state device having a controllably switchable main circuit connected between said element second electrode and said output terminal and a control electrode controlling said main circuit to conduct a flow of current therethrough responsive to a signal received thereat; and a current source connected between said element second electrode and said device control electrode for providing said signal whenever said element conducts.

2. The power supply of claim 1, wherein said current source includes at least one diode connected in series with said device main circuit; a transistor having a collector-emitter circuit connected in series with said device control electrode, and a base electrode connected to the junction between said at least one diode and said device main circuit; and a resistance element connected in series with said transistor collector-emitter circuit for establishing the magnitude of current sourced to said device control electrode.

3. The power supply of claim 2, wherein said device comprises a series-pass Darlington transistor.

4. The power supply of claim 2, further comprising disabling means including a gateable device having a controlled circuit connected between said device control electrode and said common terminal, and a gate electrode; and a voltage reference element connected between said output terminal and said gate electrode, and of value selected to cause said gateable device controlled circuit to conduct to said common terminal only when the voltage across said charge storing means reaches said selected magnitude.

5. The power supply of claim 4, wherein said gateable device is a silicon controlled rectifier, and said voltage reference element is a zener diode.

6. The power supply of claim 1, wherein said charge storage means is an electrical capacitance.

7. The power supply of claim 1, further comprising disabling means including a gateable device having a controlled circuit connected between said device control electrode and said common terminal, and a gate electrode; and a voltage reference element connected between said output terminal and said gate electrode, and of value selected to cause said gateable device controlled circuit to conduct to said common terminal only when the voltage across said charge storing means reaches said selected magnitude.

8. The power supply of claim 7, wherein said gateable device is a silicon controlled rectifier, and said voltage reference element is a zener diode.

* * * * *